US010708153B2

(12) United States Patent
Yin et al.

(10) Patent No.: US 10,708,153 B2
(45) Date of Patent: Jul. 7, 2020

(54) IDENTIFYING HEARTBEAT MESSAGES

(71) Applicant: ENTIT SOFTWARE LLC, Sanford, NC (US)

(72) Inventors: Peng-Ji Yin, Shanghai (CN); Avishai Moshka, Yehud (IL); Yang Luo, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/544,671

(22) PCT Filed: Jan. 30, 2015

(86) PCT No.: PCT/CN2015/071998
§ 371 (c)(1),
(2) Date: Jul. 19, 2017

(87) PCT Pub. No.: WO2016/119238
PCT Pub. Date: Aug. 4, 2016

(65) Prior Publication Data
US 2018/0006910 A1   Jan. 4, 2018

(51) Int. Cl.
*G06F 15/16* (2006.01)
*H04L 12/26* (2006.01)
(Continued)

(52) U.S. Cl.
CPC ............... *H04L 43/04* (2013.01); *G06F 9/44* (2013.01); *H04L 43/10* (2013.01); *H04L 43/12* (2013.01);
(Continued)

(58) Field of Classification Search
CPC ......... G06F 9/44; H04L 67/02; H04L 43/106; H04L 67/145; H04L 43/12; H04L 43/10; H04L 43/04
(Continued)

(56) References Cited

U.S. PATENT DOCUMENTS

| 5,933,692 A | 8/1999 | Grover |
| 8,631,106 B2 | 1/2014 | Huang et al. |

(Continued)

FOREIGN PATENT DOCUMENTS

| CN | 101695171 A | 4/2010 |
| CN | 102014416 A | 4/2011 |

(Continued)

OTHER PUBLICATIONS

International Searching Authority, International Search Report and Written Opinion; PCT/CN2015/071998; dated Oct. 28, 2015; 12 pages.

(Continued)

*Primary Examiner* — Oscar A Louie
*Assistant Examiner* — Oluwatosin M Gidado

(57) ABSTRACT

Examples relate to identifying heartbeat messages. In one example, a computing device may: obtain a plurality of messages that includes incoming messages and outgoing messages, each incoming message being sent from a server device to a client device, and each outgoing message being sent from the client device to the server device; identify candidate message pairs, each candidate message pair including one incoming message and one outgoing message; and identify a heartbeat message pair from the candidate message pairs based on at least one of: plurality of timestamps that includes i) incoming message timestamps that each correspond to one of the incoming messages, and ii) outgoing message timestamps that each correspond to one of the outgoing messages; a number of occurrences of each candidate message pair included a message log; or characteristics of data included in the incoming message and outgoing message of each candidate message pair.

19 Claims, 4 Drawing Sheets

(51) Int. Cl.
 *G06F 9/44* (2018.01)
 *H04L 29/08* (2006.01)
(52) U.S. Cl.
 CPC ......... *H04L 67/145* (2013.01); *H04L 43/106* (2013.01); *H04L 67/02* (2013.01)
(58) Field of Classification Search
 USPC ....................................................... 709/224
 See application file for complete search history.

(56) References Cited

U.S. PATENT DOCUMENTS

| | | | | |
|---|---|---|---|---|
| 2010/0195489 | A1* | 8/2010 | Zhou | H04L 12/433 370/216 |
| 2010/0281107 | A1 | 11/2010 | Fallows et al. | |
| 2013/0171960 | A1* | 7/2013 | Kandregula | G06F 11/3013 455/405 |
| 2014/0109041 | A1 | 4/2014 | Yunten | |
| 2014/0112318 | A1* | 4/2014 | Zhou | H04W 72/04 370/336 |
| 2015/0382302 | A1* | 12/2015 | Davis | H04W 52/028 370/311 |
| 2016/0210209 | A1* | 7/2016 | Verkaik | G06F 11/2033 |

FOREIGN PATENT DOCUMENTS

| | | |
|---|---|---|
| CN | 102036275 A | 4/2011 |
| EP | 2566259 A2 | 3/2013 |
| KR | 20020019222 A | 3/2002 |

OTHER PUBLICATIONS

Somogyi. Analysis of Server-smartphone Application Communication Patterns, Jun. 15, 2014, 83 pages https://aaltodoc.aalto.fi/bitstream/handle/123456789/14045/master_somogyi_p%.

* cited by examiner

IDENTIFYING HEARTBEAT MESSAGES

BACKGROUND

Computing devices, such as personal computers, server computers, and mobile devices, often communicate with one another across networks using the transmission control protocol (TCP), or TCP/IP. TCP is designed to provide a reliable manner for sending and receiving data across a network, and it may be used by web browsers when connecting to the World Wide Web and to deliver email and other files from one computer to another. While computing devices may support multiple TCP connections, too many connections may overload available system resources and/or cause performance issues. To reduce the likelihood of overloading and to increase the quality and availability of additional TCP connections, computing devices may close TCP connections that are not actively being used.

BRIEF DESCRIPTION OF THE DRAWINGS

The following detailed description references the drawings herein.

DETAILED DESCRIPTION

Figure 1:
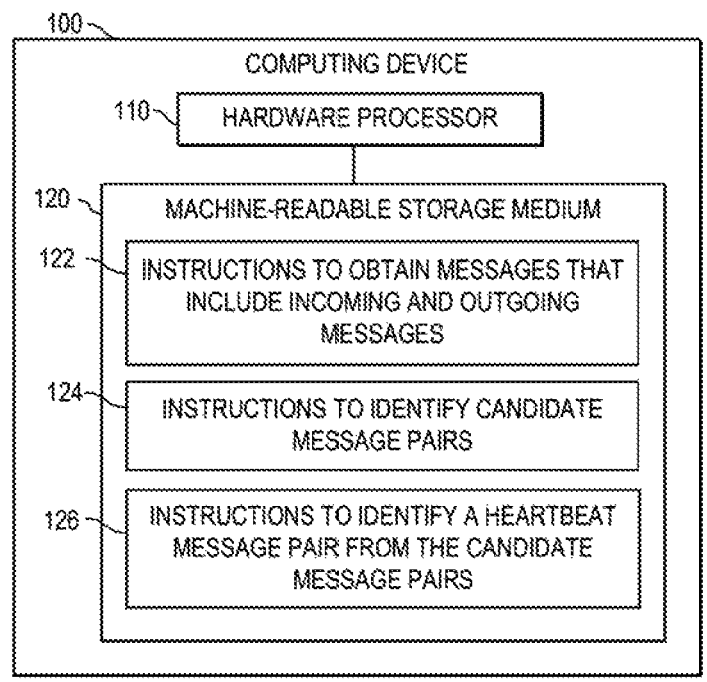
FIG. 1 is a block diagram of an example computing device for identifying heartbeat messages.

Heartbeat messages are communications sent between computing devices to keep a connection between the devices open. One implementation of a heartbeat message involves the use of "ping" and "pong" messages, where one computing device sends a ping message to a second device, and the second device responds with a pong message. For example, a server computer may have multiple open TCP connections with multiple user devices. The server computer may periodically send ping messages to the user devices to determine whether or not the user devices are still active and/or connected. If any user device fails to respond to the ping message with a pong message, the server computer may close the TCP connection, freeing up system resources to better server active and/or additional user devices.

To respond to a ping message, a computing device generally identifies the messages as a ping message and responds with the appropriate pong message. Ping and pong messages may vary based on the types of connections between computing devices, the application(s) causing transmittal of data, and/or communications protocol(s) used by the computing devices. For example, computing devices running applications that use the HTML 5 WebSocket protocol to communicate may use a standard frame-based ping/pong defined in the WebSocket RFC or a message-based ping/pong defined by the applications. Because of the various types of heartbeat messages that can be used, identifying heartbeat messages is a non-trivial task.

Identification of heartbeat messages is not only useful for computing devices to determine when to provide a pong message, but may also be useful for analytical and testing purposes. For example, a load testing system may stress test a server computer by causing numerous virtual client devices to attempt to communicate with the server computer. To ensure that the virtual client devices behave in a manner similar to real client devices, and to ensure—for stress testing purposes—that they remain connected, they may be instructed to communicate with the server computer in a variety of ways, including identifying and responding to heartbeat messages. Accordingly, a load testing system would benefit from the ability to generate virtual client devices that are able to respond to various types of heartbeat messages.

In general, a system may identify heartbeat messages by obtaining a set of messages passed between computing devices, e.g., WebSocket messages passed between a client and server device. The system may detect heartbeat messages by identifying message pairs that include i) an outgoing message that followed an incoming message and ii) the incoming message that preceded the outgoing message. Because two-way WebSocket communications may result in many message pairs, not all of which are ping/pong message pairs, the identified pairs are further analyzed to determine likely heartbeat messages. Characteristics of message pairs that may be used to identify heartbeat messages include, for example, timestamps of the message pairs, repeat message pair occurrences, the intervals between message pairs, and the content of the messages pairs. Identification of heartbeat messages based on message characteristics is discussed in further detail below.

Referring now to the drawings, FIG. 1 is a block diagram of an example computing device 100 for identifying heartbeat messages. Computing device 100 may be, for example, a server computer, a personal computer, a mobile computing device, or any other electronic device suitable for processing network communications data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-126, to control the process for heartbeat message identification. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-126, for identifying heartbeat messages.

As shown in FIG. 1, the computing device 100 obtains messages that include incoming and outgoing messages (122). Each incoming message is sent from a server device to a client device, and each outgoing message is sent from the client device to the server device. In some implementations, the messages are obtained from a data storage device that stores messages, e.g., a log created by the server and/or client device, or a log stored separately from the client and server device. In some implementations, the messages are obtained by recording messages passed between the client and server device. For example, the computing device 100 may act as or emulate a client device and log messages sent between the computing device 100 and server device.

The computing device 100 identifies candidate message pairs (124). The candidate message pairs are identified from the obtained incoming and outgoing messages, and each candidate message pair includes one incoming message and one outgoing message. In some implementations, the computing device 100 identifies, as a candidate message pair, each incoming message that is followed by an outgoing message. For example, if message sent by the server is received by the client device and followed by an outgoing message to the server, e.g., before another message is received from the server, the incoming and outgoing message may be identified as a candidate message pair. Due to the nature of ping/pong type heartbeat messages, in many situations it is likely that most ping messages are almost immediately followed by pong messages. Accordingly, when an incoming message received by the client device is not followed by an outgoing message, it is unlikely that the incoming message is a ping message.

The computing device 100 identifies a heartbeat message pair from the candidate message pair (126). The heartbeat message pair may be identified based on a) timestamps that include i) incoming message timestamps that each correspond to one of the incoming messages, and ii) outgoing message timestamps that each correspond to one of the outgoing messages, b) a number of occurrences of each message pair in a message log, or c) characteristics of data included in the incoming message and outgoing message of each candidate message pair. Message timestamps may specify, for example, a dock time that a message was sent and/or received by the respective sending and/or receiving device. The number of occurrences of a message pair may be determined, for example, by counting message pairs that include matching content, e.g., where the content of a first incoming message matches the content of a second incoming message, and the content of a first outgoing message matches the content of a second outgoing message. Characteristics of data included in the messages may include the content of each message, e.g., the payload, and/or other data included in the message header.

In some implementations, the computing device 100 identifies a heartbeat message pair by determining that a difference in time between the incoming message and outgoing message of a particular candidate message pair is within a threshold period of time. For example, given a threshold of 50 ms, a particular candidate message pair may be identified as a heartbeat message pair by determining that the difference between the incoming message timestamp and outgoing message timestamp is less than or equal to 50 ms. Because a computing device that receives a ping message generally doesn't require significant processing time to produce a pong message, a quick response time may be indicative of a ping/pong type heartbeat message.

In some implementations, the computing device 100 identifies a heartbeat message pair by determining, for a particular candidate message pair, that a number of other occurrences of the particular candidate message pair meets an occurrence threshold. For example, matching candidate message pairs may be identified based on their content, e.g., pairs may match when the contents of both the incoming and outgoing messages match. If a candidate message pair repeats itself 20 times, or 10 times within a certain period of time, the computing device 100 may identify it—and each of the matching candidate message pairs—as a heartbeat message. Because each ping message is likely to match every other ping message, and every pong message is likely to match every other pong message, repeated message pairs may also be indicative of ping/pong type heartbeat message pairs.

In some implementations, the computing device 100 identifies a heartbeat message pair by identifying matching candidate message pairs and determining that intervals of time between consecutive matching candidate pairs are within a threshold measure of variance. By way of example, matching candidate pairs may be identified as described above, e.g., based on the content included in the messages, and the intervals of time between matching candidate pairs may be determined based on the timestamps associated with the pairs. In situations where the threshold variance is 1 second, four consecutive matching candidate pairs with intervals of 10 seconds, 9.7 seconds, and 9.5 seconds would all be within 1 second of variance, while intervals of 10 seconds 9.7 seconds, and 6 seconds, would not be within the 1 second threshold measure of variance. Because computing devices are often configured to send ping messages at regular intervals, relatively consistent time intervals between matching candidate message pairs may be indicative of ping/pong type heartbeat message pairs.

In some implementations, the computing device 100 identifies a heartbeat message pair based on the size of the data included in the incoming message of a particular candidate message pair and the size of the data included in the outgoing message of the particular candidate message pair. For example, if the data, or payload, of both the incoming and outgoing message is less than a threshold size, e.g., 40 bytes, the computing device 100 may identify the particular message pair as a heartbeat message pair. Because ping and pong messages generally need not include much data in the payload portion of the corresponding messages, the size of the payloads for a candidate message pair may be indicative of a ping/pong type heartbeat message.

In some implementations, identification of a heartbeat message by the computing device 100 may be a binary decision, e.g., a message pair is either identified as a heartbeat message pair or not. In some implementations, the computing device 100 may identify a measure of confidence that a particular message pair is a heartbeat message. For example, the computing device may determine that a candidate message pair has a 90% chance of being a heartbeat message. Measures of confidence may be useful, for example, in situations where multiple different candidate message pairs may be heartbeat messages, e.g., in situations where using two different types of heartbeat message in the same application is unlikely, a measure of confidence may be used to select one message pair most likely to be the heartbeat message.

In situations where measures of confidence are used to identify a likelihood that a candidate message pair is a heartbeat message, a threshold measure of confidence may be used to make a binary decision, e.g., a candidate message pair with more than 80% chance of being a heartbeat message may be identified as a heartbeat message. Thresholds may be determined in a variety of ways, e.g., administrator input and/or machine learning.

Measures of confidence, or the likelihood that a candidate message pair is a heartbeat message pair, may be determined in a variety of ways. In some implementations, machine learning methods, e.g., regression analysis and/or supervised learning models, may be used to train a function to produce a measure of likelihood based on a given input. Using turnaround time, or response time, as an example, training data gathered for multiple heartbeat message identification sessions may indicate that the probability of a candidate message pair with a response time of 50 ms being a heartbeat message is 0.9. E.g., given a response time of 50 ms, there is a 90% chance that the corresponding candidate message pair is a heartbeat message pair. A trained function may be used to determine heartbeat message probability given any response time as input. In some implementations, rather than using a trained function to determine a discrete probability that a message pair is a heartbeat message pair, training data may be used to identify a threshold, e.g., in situations where 80% certainty is desired, training data may be used to determine that a response time within 65 ms provides an 80% certainty that a message pair is a heartbeat message pair.

While each of the above example methods for identifying heartbeat messages from candidate messages is described separately, one or more of the methods may be combined. For example, the computing device 100 may determine to identify heartbeat messages based on both the response time (the interval between incoming and outgoing messages) and the number of times a message pair is repeated. In situations where measures of confidence are used, the measure of confidence for a given message pair may be based on a combination of confidence measures.

In implementations where machine learning methods are used to train a model for determining the confidence that message pairs are heartbeat messages, different methods of combining measures of confidence may be used. For example, a sum or average of probabilities determined for one or more methods may be used to determine the confidence that a message pair is a heartbeat message pair. As another example, one function may be trained to take into account multiple variable, and the weight of each variable may vary. For example, machine learning methods may determine that consistent intervals between repeated candidate message pairs is a better indicator than the size of the content included in a candidate message pair. In this situation, a trained model may weigh the time intervals more heavily than the size of message content.

Many combinations of machine learning and/or administrator input may be used to determine which, and to what extent, various indicators suggest that a candidate message pair is a heartbeat message pair. In some situations, the computing device 100 may not identify a heartbeat message pair, or may not identify a heartbeat message pair with sufficient confidence. Failure to identify a heartbeat message pair may indicate that no ping/pong based heartbeat message is being used in the client-server communications being analyzed.

In some implementations, the computing device 100 generates heartbeat instructions in response to identifying a heartbeat message pair. The heartbeat instructions cause a particular outgoing message, e.g., a pong message, to be produced in response to receipt of a particular incoming message, e.g., a ping message. The particular incoming and outgoing messages are based on the corresponding incoming and outgoing messages included in the heartbeat message pair. For example, after identifying a heartbeat message pair, the computing device 100 may generate instructions, or code, that a client device may use to respond to a pong message with a ping message. The heartbeat instructions may be combined with existing instructions for operating a virtual client device. For example, in situations where a load testing system creates virtual client devices to stress test a server computer, the heartbeat instructions may be used to ensure that virtual client devices respond to the server computer's ping messages with pong messages.

In implementations where the computing device 100 generates heartbeat instructions, some or all of the heartbeat instructions may be stored in a database of predefined heartbeat instructions. For example, machine-readable storage medium 120 may include heartbeat instructions that include one or more variables to be filled in by the computing device 100 based on the particular heartbeat message identified. E.g., if, for an identified heartbeat message, the pong message includes only the text, "ping," and the pong message includes only the text, "pong," predefined heartbeat instructions may be stored that need only be filled in with the appropriate text, e.g., "ping" and "pong."

In some implementations, separate computing devices, such as separate computing devices 100, may be used for various features described above. For example, one computing device may train a model for determining whether a candidate message pair is a heartbeat message pair, another computing device may apply the model to identify heartbeat messages, another device may generate heartbeat instructions based on the heartbeat messages, and yet another computing device may use the heartbeat instructions to create virtual machines that include the heartbeat instructions. Other combinations of computing devices may also be used.

Figure 2A:
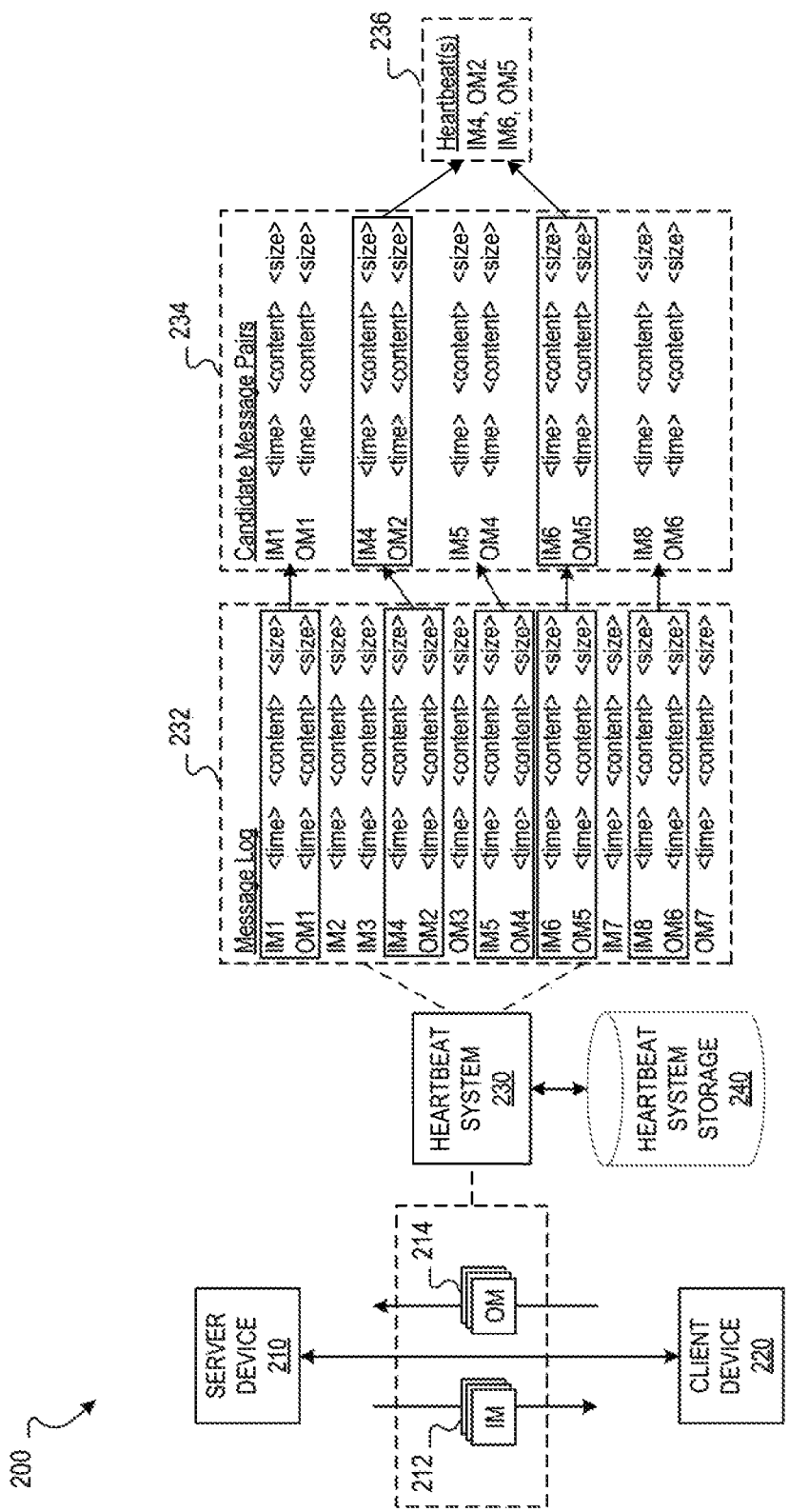
FIG. 2A is an example data flow for identifying heartbeat messages.

FIG. 2A is an example data flow 200 for identifying heartbeat messages. The data flow depicts a heartbeat system 230, which may be implemented by a computing device, such as the computing device 100 described above with respect to FIG. 1. The server device 210 and client device 220 may be any computing device suitable for message based communications, such as a personal computer, mobile computer, or server computer. For example, the server device 210 may be a web server that hosts a social network news feed website and an application that provides social network news updates to end-users; the client device 220 may be an end-user of the social network that is in communication with the web server, to receive social network news updates.

The heartbeat system 230 obtains messages, e.g., incoming messages 212 and outgoing messages 214, that were transmitted between the server device 210 and client device 220. The messages may be transmitted, for example, using WebSocket protocol, which allows two-way communications between the server device 210 and client device 220 over a single TCP connection. In the social network news example, the web server may provide the client device 220, e.g., in incoming messages 212, with data that causes a news feed running in the client device's 220 web browser to display social network news that is relevant to the end-user of the client device 220. The two-way WebSocket connection may allow the client device 220 to interact with the social media network news feed using the same TCP connection, e.g., posting a comment on a particular news item via one or more outgoing messages 214. As long as the connection remains open between the server device 210 and client device 220, messages may be passed between them, e.g., facilitating near-live, or near-real-time news updates for the end-user.

While the heartbeat system 230 is shown as recording messages between the client device 220 and server device 210, other methods of obtaining messages may be used, e.g., by acting as a client device 220 or retrieving messages from the client device 220, server device 210, or a separate storage device, such as heartbeat system storage 240. In the example data flow 200, a representation of the messages is shown in an example message log 232. The example message log 232 indicates, for each incoming messages 212 and each outgoing message 214, a timestamp, the content of the message, and a size of the message. While the example message log 232 includes 15 total messages, in some situations many more messages may be obtained, e.g., a log may include thousands of messages.

The heartbeat system 230 identifies candidate message pairs included in the message log 232. Each candidate message pair includes an incoming message sent from the server device 210 to the client device 220 and an outgoing message sent from the client device 220 to the server device 210 in response to receiving the incoming message. In the example data flow 200, the heartbeat system has identified, as candidate message pairs 234, the following set of candidate message pairs: {(IM1, OM1), (IM4, OM2), (IM5, OM4), (IM6, OM5), (IM8, OM6)}. Each candidate message pair includes one incoming messages that was followed by an outgoing message.

The heartbeat system 230 identifies a heartbeat message pair 236 from the candidate message pairs 234. The heartbeat message pairs 236 are identified based on a number of occurrences of matching candidate message pairs included a message log. For example, the candidate message pairs 234 in the example data flow 200 include five pairs of candidate messages. Based on content included in the incoming and outgoing messages, the heartbeat system 230 may determine that the pairs, (IM4, OM2) and (IM6, OM5), are heartbeat message pairs because they match, e.g., there is one occurrence of a match between candidate message pairs. To be considered a match, some or all of the payload of message IM4 may be the same as the payload of message IM6, and some or all of the payload of message OM2 may be the same as the payload of message OM5. A match of content need not be an identical match, e.g., if the payload includes a timestamp, the timestamp may be ignored for the purposes of determining whether or not the payload matches. The number of occurrences, while one in the foregoing example, may be any suitable number of occurrences.

By way of example, if the server device 210 is a social media network server providing news items, the first candidate message pair (IM1, OM1) may be messages for establishing communications between the social media server and the client device 220. The next two messages, IM2 and IM3, are not identified as candidate messages because they are not followed by outgoing messages. They may be, for example, news articles or news posts that were provided to the client device 220. The next two messages, IM4 and OM2, are identified as candidate messages because the OM2 follows IM4. A social network server may, for example, have provided a ping message in IM4 to determine if the client device 220 was still connected. When the client device responds with a pong message in OM2, the social media server will keep the connection between it and the client device 220 open. In situations where the client device doesn't respond, e.g., because the end-user navigated away from the social media website or closed the web browser, the social media network server may close the connection and stop sending messages—freeing server resources for serving other clients.

Outgoing message OM3 is not immediately preceded by an incoming message and is accordingly not identified as part of a candidate message pair. It may include, for example, a comment provided to the social media network server for posting in association with a news post. Other messages in the example message log 232, such as messages IM5 and OM4, are identified as a candidate message pair, as are messages IM6 and OM5, and IM8 and OM6, while messages IM7 and OM7 are not identified as part of a candidate message pair. As noted above, the candidate message pair (IM6, OM5) is identified in the example data flow 200 as a heartbeat message pair, e.g., based on matching message content. In implementations using matching candidate message pairs to identify heartbeat messages, each pair not identified as a heartbeat message, e.g., (IM1, OM1) (IM5, OM4), (IM8, OM6), does not match any other candidate message pair.

In some implementations, the heartbeat system 230 may identify a heartbeat message pair by determining that the difference in time between the incoming and outgoing messages of a particular candidate message pair is within a threshold period of time. For example, the heartbeat system may use message timestamps to determine the amount of time that elapsed between the incoming and outgoing messages of each candidate message pair. In the social media network example, ping/pong heartbeat messages would generally be processed very quickly relative to the time that might pass between a client device receiving a news post and providing a response associated with that news post. While false positives are possible, e.g., many types of non-heartbeat incoming messages may be responded to very quickly by the client device 220, combining heartbeat message indicators may, in some implementations, increase the accuracy of heartbeat message identification. For example, a candidate message pair that has both a) a fast response time between the incoming and outgoing message, and b) a matching candidate message pair, may be more likely to be a heartbeat message pair than another candidate message pair that has only one of the aforementioned characteristics.

In some implementations, the heartbeat system 230 identifies a heartbeat message pair in response to determining that each interval of time between consecutive matching candidate pairs is within a threshold measure of variance. In the example data flow 200, an interval of time between matching candidate message pairs (IM4, OM2) and (IM6, OM5) may be, determined, e.g., by determining the difference between timestamps of IM4 and IM6, or between timestamps of OM2 and OM5. The example data flow 200 does not include an addition matching candidate pair; however, given an example where an additional heartbeat message pair was recorded in the message log, e.g., as (IM9, OM7), the interval of time between the additional message pair and the previous matching pair, (IM6, OM5), may be within a threshold measure of variance to be considered a heartbeat message pair. This indicator may facilitate identification, for example, in situations where the method of implementing ping/pong based heartbeat messages includes sending ping messages at regular intervals, in which case matching candidate message pairs that are separated by a near-equal amount of time may provide further indication that the candidate message pairs are heartbeat message pairs.

Other indicators, such as those described above with reference to FIG. 1, e.g., the size of the message content, or payload, may also be used by the heartbeat system to identify heartbeat message pairs 236. As also described above, the ways in which thresholds, variance, and numbers of occurrences are determined may vary, e.g., machine learning and/or administrator supplied.

Heartbeat message pairs, once identified, may be handled in a variety of ways, e.g., storing in heartbeat system storage 240. One application, described with reference to FIG. 2B, uses identified heartbeat messages to generate heartbeat instructions which facilitate the emulation of client devices using virtual machines.

Figure 2B:
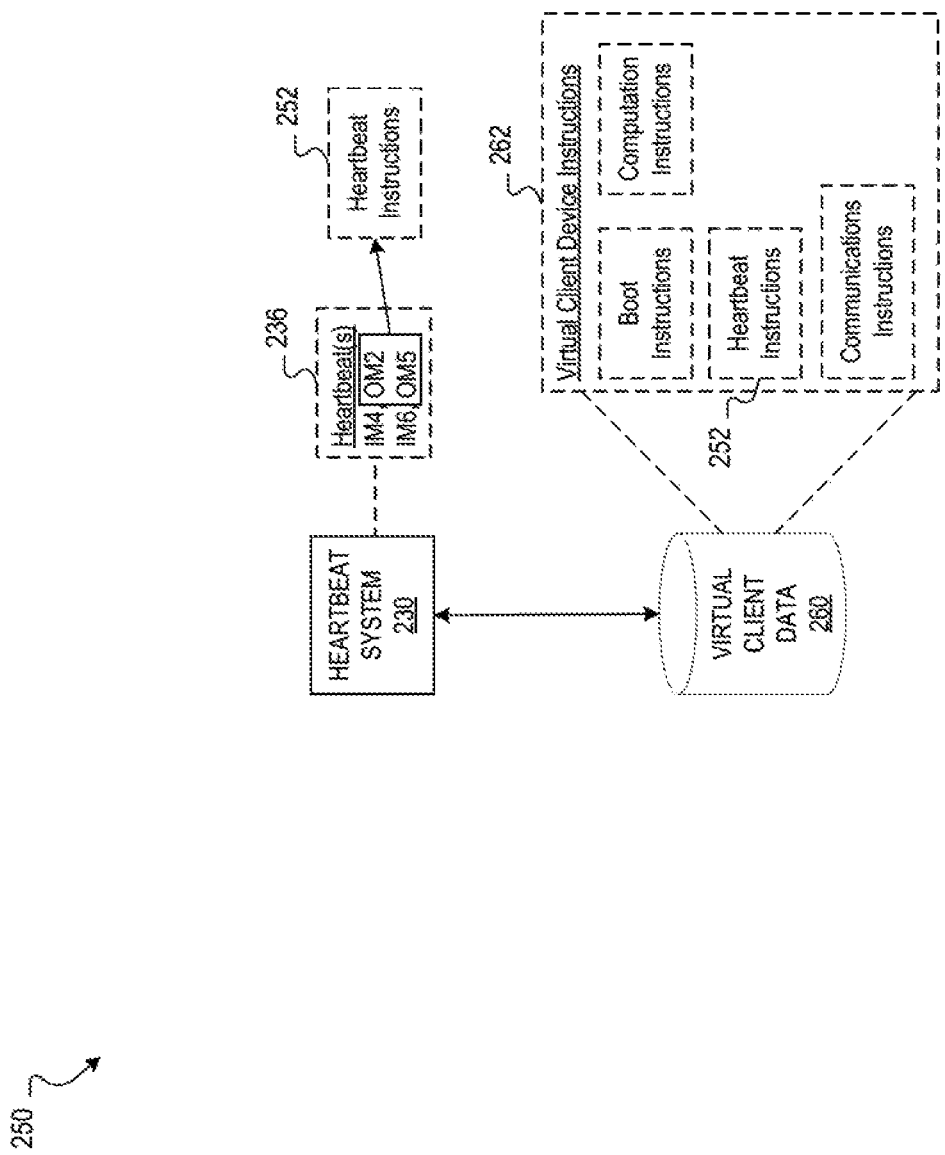
FIG. 2B is an example data flow for generating heartbeat instructions.

FIG. 2B is an example data flow 250 for generating heartbeat instructions 252. The example data flow 250 depicts, in part, operations that may be performed by a heartbeat system that facilitates generation of heartbeat instructions for virtual machines, e.g., for use by a load testing system. In some implementations, the heartbeat system 230 generates, in response to identifying a heartbeat message pair (or pairs), heartbeat instructions 252. The heartbeat instructions 252 cause a particular outgoing message to be produced in response to receipt of a particular incoming message. The particular outgoing message is based on the outgoing message(s) of the identified heartbeat message pair(s), e.g., OM2 and OM5, and the particular incoming message is based on the incoming message(s) of the identified heartbeat message pair(s), e.g., IM4 and IM6. For example, the heartbeat instructions 252 are designed to provide a computing device with instructions to respond to a ping message, e.g., a message that matches IM4 or IM6, with a pong message, e.g., a message that matches OM2 or OM5.

In the example data flow 250, the heartbeat system 230 causes the heartbeat instructions 252 to be combined with existing instructions 262 for operating a virtual client device. A virtual client device is designed to emulate a client device, such as client device 220. Virtual client device instructions 262 may include, for example, boot instructions that facilitate initialization of the virtual client device, computation instructions that determine computations capable of being performed by the virtual client device, and communications instructions that facilitate communications between the virtual client device and other devices, such as instructions that facilitate the use of a WebSocket connection between a virtual client device and the server device 210.

In situations where virtual machines are used in a load testing environment, e.g., to stress test server device 210, heartbeat instructions 252 are included in the virtual client device instructions 262, e.g., stored in virtual client data 260 accessible to the heartbeat system 230, to enable virtual client devices to handle heartbeat messages. If a virtual client device is unable to properly respond to a server heartbeat message, a server device under stress may close a WebSocket connection between the server device and the virtual client device prematurely, reducing the effectiveness of using virtual client devices for stress testing purposes. Identification of heartbeat instructions may have other applications, such as heartbeat performance testing.

While the heartbeat system 230 is depicted in example data flows 200 and 250 as both identifying heartbeat messages 236 and generating heartbeat instructions 252 for inclusion in virtual client device instructions 262, the operations described above may be performed by multiple computing devices. In addition, while some of the above examples describe communications between a client device and server device, heartbeat messages may be passed between many types of computing devices, and heartbeat message identification need not be limited to client-server communications.

Figure 3:
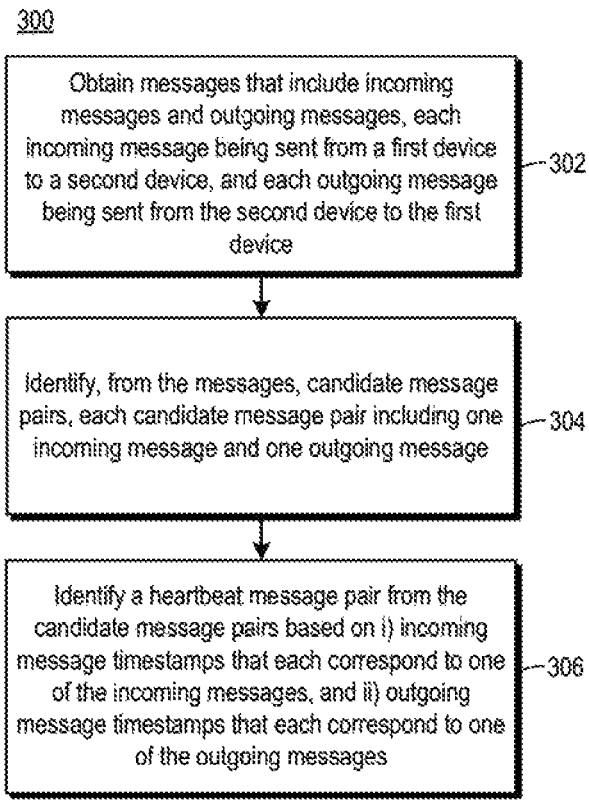
FIG. 3 is a flowchart of an example method for identifying heartbeat messages.

FIG. 3 is a flowchart of an example method 300 for identifying heartbeat messages. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry.

Messages that include incoming messages and outgoing messages are obtained, each incoming message being sent from a first device to a second device, and each outgoing message being sent from the second device to the first device (302). For example, a heartbeat system may obtain a session log of two-way messages sent between two computing devices.

From the obtained messages, candidate message pairs are identified, each candidate message pair including one incoming message and one outgoing message (304). For example, the heartbeat system may identify, as candidate message pairs, each incoming message that is followed by an outgoing message within n seconds or milliseconds. In some implementations, heartbeat messages may be two-way, and the heartbeat system may identify, instead or in addition, each outgoing message that is followed by an incoming message within n seconds or milliseconds. For example, a heartbeat system may be unaware of which computing device(s) is/are providing a ping message, and in these situations, the heartbeat system may treat both devices as devices potentially generating ping messages.

A heartbeat message pair is identified from the candidate message pairs based on i) incoming message timestamps that each correspond to one of the incoming messages, and ii) outgoing message timestamps that each correspond to one of the outgoing messages (306). For example, a heartbeat system may identify a heartbeat message pair by determining, for a particular candidate message pair, that a difference in time between the incoming message and outgoing message of the particular candidate message pair is within a threshold period of time, where the difference in time is determined based on i) the incoming message timestamp for the incoming message of the particular candidate message pair, and ii) the outgoing message timestamp for the outgoing message of the particular candidate message pair. A heartbeat system may identify the particular candidate message pair as a heartbeat message pair in response to determining that the difference in time is within the threshold period of time.

In some implementations, the heartbeat message pair is further identified as a heartbeat message pair only by determining that, for the particular candidate message pair, a number of occurrences of other candidate message pairs matching the particular candidate message pair meets an occurrence threshold. For example, in situations where an occurrence threshold is 50, a heartbeat system may only identify a candidate message pair as a heartbeat message pair if the candidate message pair matches 49 other candidate message pairs, and each of the matching candidate message pairs have incoming and outgoing timestamps within the threshold period of time.

In some implementations, matching candidate pairs each include data that matches data included in other matching candidate pairs, and the particular candidate message pair is identified as the heartbeat message pair only in response to determining that each interval of time between consecutive matching candidate pairs is within a threshold measure of variance. For example, in addition to the indicator requirements described in the implementations above, some implementations of a heartbeat system may only identify a heartbeat message pair when intervals of time between the 50 matching candidate message pairs are within a threshold measure of variance, such as 1 second. If any of the intervals between consecutive matching candidate message pairs are greater than the threshold measure of variance, then none of the candidate message pairs are identified as a heartbeat message pair.

The foregoing disclosure describes a number of example implementations for identifying heartbeat messages. As detailed above, examples provide a mechanism for identifying ping/pong type heartbeat messages and potential applications of a system that is capable of identifying such heartbeat messages.

We claim:

1. A computing device for identifying heartbeat messages, the computing device comprising:
a hardware processor; and
a data storage device storing instructions that, when executed by the hardware processor, cause the hardware processor to:
obtain a plurality of messages that include incoming messages and outgoing messages, each incoming message being sent from a server device to a client device, and each outgoing message being sent from the client device to the server device;
identify, from the plurality of messages, candidate message pairs, each candidate message pair including one incoming message and one outgoing message; and
identify, from the candidate message pairs, a heartbeat message pair, the heartbeat message pair including an incoming message and a corresponding outgoing message, the corresponding outgoing message being outputted by the client device in response to receipt of the incoming message from the server device by the client device, based on a number of occurrences of each candidate message pair included in a message log.

2. The computing device of claim 1, wherein the instructions further cause the hardware processor to:
generate, in response to the heartbeat message pair being identified, heartbeat instructions that cause a particular outgoing message to be produced in response to receipt of a particular incoming message, wherein the particular outgoing message is based on the outgoing message included in the heartbeat message pair, and the particular incoming message is based on the incoming message included in the heartbeat message pair; and
cause the heartbeat instructions to be combined with existing instructions to operate a virtual client device.

3. The computing device of claim 1, wherein to identify the candidate message pairs, the instructions further cause the hardware processor to:
for each incoming message that is followed by a following outgoing message, identify the incoming message and the following outgoing message as one of the candidate message pairs.

4. The computing device of claim 1, wherein to identify the heartbeat message pair, the instructions further cause the hardware processor to:
determine, for a particular candidate message pair, that a difference in time between the incoming message and the outgoing message of the particular candidate message pair is within a threshold period of time, the difference in time being determined based on i) an incoming message timestamp for the incoming message of the particular candidate message pair, and ii) an outgoing message timestamp for the outgoing message of the particular candidate message pair; and
identify the particular candidate message pair as the heartbeat message pair in response to a determination that the difference in time is within the threshold period of time.

5. The computing device of claim 1, wherein to identify the heartbeat message pair, the instructions further cause the hardware processor to:
determine, for a particular candidate message pair, a number of occurrences of other candidate message pairs matching the particular candidate message pair; and
identify the particular candidate message pair as the heartbeat message pair in response to a determination that the number of occurrences meets an occurrence threshold.

6. The computing device of claim 1, wherein to identify the heartbeat message pair, the instructions further cause the hardware processor to:
identify a plurality of matching candidate message pairs that each include data that matches data included in other ones of the plurality of matching candidate message pairs; and
identify one of the plurality of matching candidate message pairs as the heartbeat message in response to a determination that each interval of time between consecutive matching candidate pairs is within a threshold measure of variance.

7. The computing device of claim 1, wherein to identify the heartbeat message pair, the instructions further cause the hardware processor to:
identify a particular candidate message pair as the heartbeat message pair based on i) a first size of data included in the incoming message of the particular candidate message pair, and ii) a second size of data included in the outgoing message of the particular candidate message pair.

8. The computing device of claim 1, wherein the instructions cause the hardware processor to:
identify, from the candidate message pairs, the heartbeat message pair based on at least one of:
a plurality of timestamps that includes i) incoming message timestamps that each correspond to one of the incoming messages, and ii) outgoing message timestamps that each correspond to one of the outgoing messages; or
characteristics of data included in the incoming message and the outgoing message of each candidate message pair.

9. The computing device of claim 1, wherein the instructions cause the hardware processor to:
determine the number of occurrences of each candidate message pair included in the message log by counting message pairs that include matching content where a content of a first incoming message matches a content of a second incoming message and a content of a first outgoing message matches a content of a second outgoing message.

10. A non-transitory machine-readable storage medium encoded with instructions executable by a hardware processor of a computing device for identifying heartbeat messages, the machine-readable storage medium comprising instructions to cause the hardware processor to:
obtain a plurality of messages transmitted between a first device and a second device;
identify, from the plurality of messages, candidate message pairs, each candidate message pair including i) an incoming message sent to the first device from the second device, and ii) an outgoing message that was sent to the second device from the first device in response to receipt of the incoming message; and
identify, from the identified candidate message pairs, a heartbeat message pair, the heartbeat message pair including an incoming message and a corresponding outgoing message, the corresponding outgoing message being outputted by the first device in response to receipt of the incoming message from the second device by the first device, based on a number of occurrences of matching candidate message pairs included in a message log.

11. The storage medium of claim 10, wherein the instructions further cause the hardware processor to:

generate, in response to identifying the heartbeat message pair, heartbeat instructions that cause a particular outgoing message to be produced in response to receipt of a particular incoming message, wherein the particular outgoing message is based on the outgoing message included in the heartbeat message pair, and the particular incoming message is based on the incoming message included in the heartbeat message pair; and cause the heartbeat instructions to be combined with existing instructions to operate a virtual client device.

12. The storage medium of claim 10, wherein to identify the heartbeat message pair, the instructions further cause the hardware processor to:

determine, for a particular candidate message pair, that a difference in time between the incoming message and the outgoing message of the particular candidate message pair is within a threshold period of time, the difference in time being determined based on i) an incoming message timestamp for the incoming message of the particular candidate message pair, and ii) an outgoing message timestamp for the outgoing message of the particular candidate message pair; and identify the particular candidate message pair as the heartbeat message pair in response to a determination that the difference in time is within the threshold period of time.

13. The storage medium of claim 10, wherein the matching candidate message pairs each include data that matches data included in other ones of the matching candidate message pairs, and the instructions cause the hardware processor to identify the heartbeat message pair in response to a determination that each interval of time between consecutive matching candidate pairs is within a threshold measure of variance.

14. The storage medium of claim 10, wherein the instructions cause the hardware processor to:

identify, from the candidate message pairs, the heartbeat message pair based on at least one of:
- a plurality of timestamps that includes i) incoming message timestamps that each correspond to one of the incoming messages, and ii) outgoing message timestamps that each correspond to one of the outgoing messages; or
- characteristics of data included in the incoming message and the outgoing message of each candidate message pair.

15. The storage medium of claim 10, wherein the instructions cause the hardware processor to:

determine the number of occurrences of matching candidate message pairs included in the message log by counting message pairs that include matching content where a content of a first incoming message matches a content of a second incoming message and a content of a first outgoing message matches a content of a second outgoing message.

16. A method for identifying heartbeat messages, implemented by a hardware processor, the method comprising:

obtaining a plurality of messages that includes incoming messages and outgoing messages, each incoming message being sent from a first device to a second device, and each outgoing message being sent from the second device to the first device;

identifying, from the plurality of messages, candidate message pairs, each candidate message pair including one incoming message and one outgoing message;

identifying, from the candidate message pairs, a heartbeat message pair, the heartbeat message pair including an incoming message and a corresponding outgoing message, the corresponding outgoing message being outputted by the second device in response to receipt of the incoming message from the first device by the second device, based on i) incoming message timestamps that each correspond to one of the incoming messages, and ii) outgoing message timestamps that each correspond to one of the outgoing messages;

determining, for a particular candidate message pair, that a difference in time between the incoming message and the outgoing message of the particular candidate message pair is within a threshold period of time, the difference in time being determined based on i) an incoming message timestamp for the incoming message of the particular candidate message pair, and ii) an outgoing message timestamp for the outgoing message of the particular candidate message pair; and identifying the particular candidate message pair as the heartbeat message pair in response to determining that the difference in time is within the threshold period of time.

17. The method of claim 16, wherein identifying the heartbeat message pair further comprises:

determining, for the particular candidate message pair, a number of occurrences of other candidate message pairs matching the particular candidate message pair; and the particular candidate message pair is identified as the heartbeat message pair only in response to determining that the number of occurrences meets an occurrence threshold.

18. The method of claim 17, wherein the particular candidate message pair is included in a plurality of matching candidate message pairs that each include data that matches data included in other ones of the plurality of matching candidate message pairs; and the particular candidate message pair is identified as the heartbeat message pair only in response to determining that each interval of time between consecutive matching candidate pairs is within a threshold measure of variance.

19. The method of claim 16, wherein identifying the heartbeat message pair further comprises:

identifying, from the candidate message pairs, the heartbeat message pair based on a number of occurrences of each candidate message pair included in a message log, wherein the number of occurrences of each candidate message pair included in the message log is determined by counting message pairs that include matching content where a content of a first incoming message matches a content of a second incoming message and a content of a first outgoing message matches a content of a second outgoing message.

* * * * *